United States Patent [19]

Saurenman

[11] 4,390,923
[45] * Jun. 28, 1983

[54] CONTROL OF STATIC NEUTRALIZATION

[75] Inventor: Donald G. Saurenman, Whittier, Calif.

[73] Assignee: Consan Pacific Incorporated, Whittier, Calif.

[*] Notice: The portion of the term of this patent subsequent to Jun. 14, 2000, has been disclaimed.

[21] Appl. No.: 290,423

[22] Filed: Aug. 6, 1981

Related U.S. Application Data

[63] Continuation-in-part of Ser. No. 259,503, May 1, 1981, which is a continuation-in-part of Ser. No. 241,684, Mar. 9, 1981, which is a continuation-in-part of Ser. No. 124,242, Feb. 25, 1980.

[51] Int. Cl.³ ............................................. H05F 3/06
[52] U.S. Cl. ..................................... 361/222; 361/212; 361/215; 361/216
[58] Field of Search .............. 361/212, 215, 216, 220, 361/222, 231, 232, 235; 119/21; 55/136, 152

[56] References Cited

U.S. PATENT DOCUMENTS

| | | |
|---|---|---|
| 1,480,573 | 1/1924 | Smith . |
| 2,043,217 | 6/1936 | Yaglou . |
| 2,231,324 | 2/1941 | Cromfton, Jr. . |
| 2,264,495 | 12/1941 | Wilner . |
| 2,565,454 | 8/1951 | MacKenzie et al. . |
| 2,585,799 | 2/1952 | Lawrence . |
| 2,641,804 | 6/1953 | Klein . |
| 2,765,975 | 10/1956 | Lindenblad . |
| 2,839,597 | 6/1958 | Hendrix ................................ 174/146 |
| 2,844,473 | 7/1958 | Hanley et al. . |
| 2,997,531 | 8/1961 | Oldham et al. ................. 174/175 X |
| 3,106,884 | 10/1963 | Dalve et al. . |
| 3,203,809 | 8/1965 | Wisness et al. . |
| 3,288,054 | 11/1966 | Weppin et al. . |
| 3,308,344 | 3/1967 | Smith et al. . |
| 3,311,108 | 3/1967 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,696,791 | 10/1972 | Saurenman ............................. 119/21 |
| 3,757,491 | 9/1973 | Gourdine . |
| 3,818,269 | 6/1974 | Stark . |
| 3,870,946 | 3/1976 | Sandorf . |
| 3,973,927 | 8/1976 | Furchner ......................... 55/136 X |
| 4,072,762 | 2/1978 | Rhodes . |
| 4,107,756 | 8/1978 | Best et al. ....................... 361/235 X |

FOREIGN PATENT DOCUMENTS 1028351 5/1966 United Kingdom .

Primary Examiner—Reinhard J. Eisenzopf
Attorney, Agent, or Firm—William W. Haefliger

[57] ABSTRACT

Apparatus to reduce static electricity in a work zone comprises:
(a) a first electrically conductive cable having tips spaced therealong to dispense positive ions in response to positive voltage application to the first cable,
(b) a second electrically conductive cable having tips spaced therealong to dispense negative ions in response to negative voltage application to the second cable,
(c) the cables located with adjusted separations from one another so that static electricity at or proximate the work is reduced to acceptable levels, and
(d) there being spacers located along the lengths of the cables and holding the cables at said adjusted separations.

42 Claims, 24 Drawing Figures

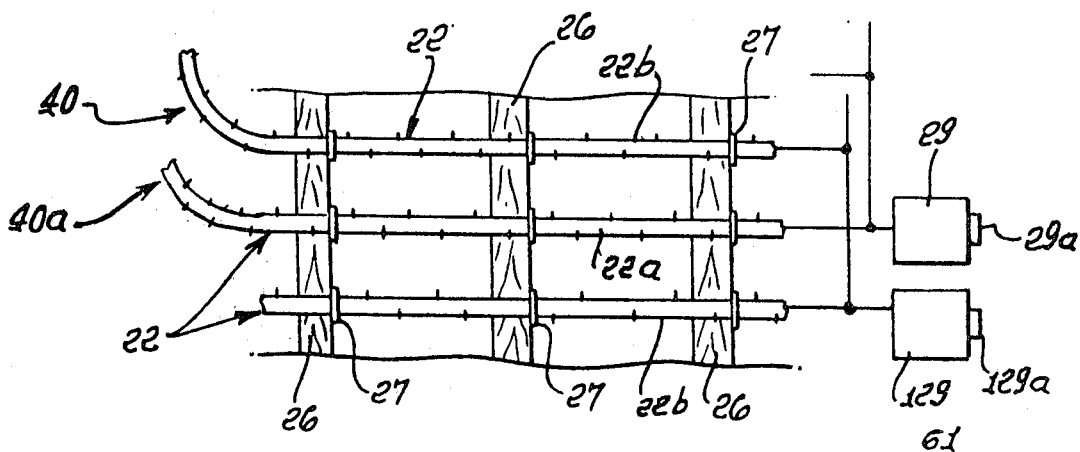
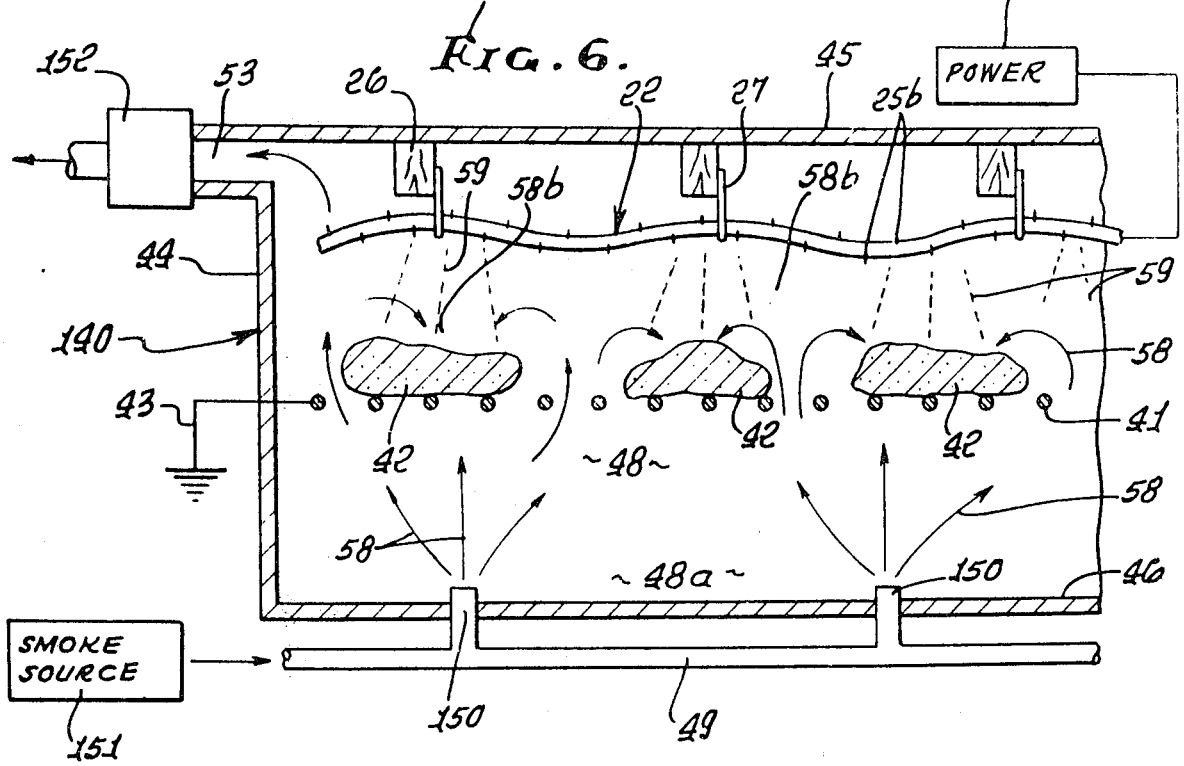
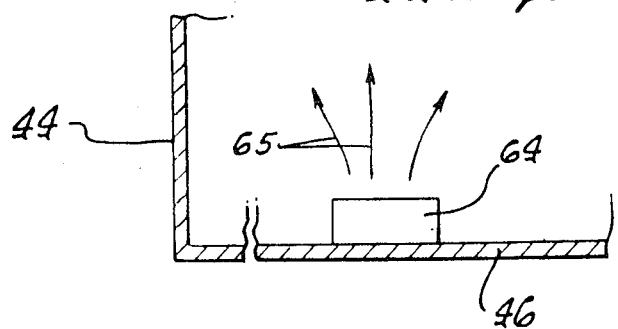

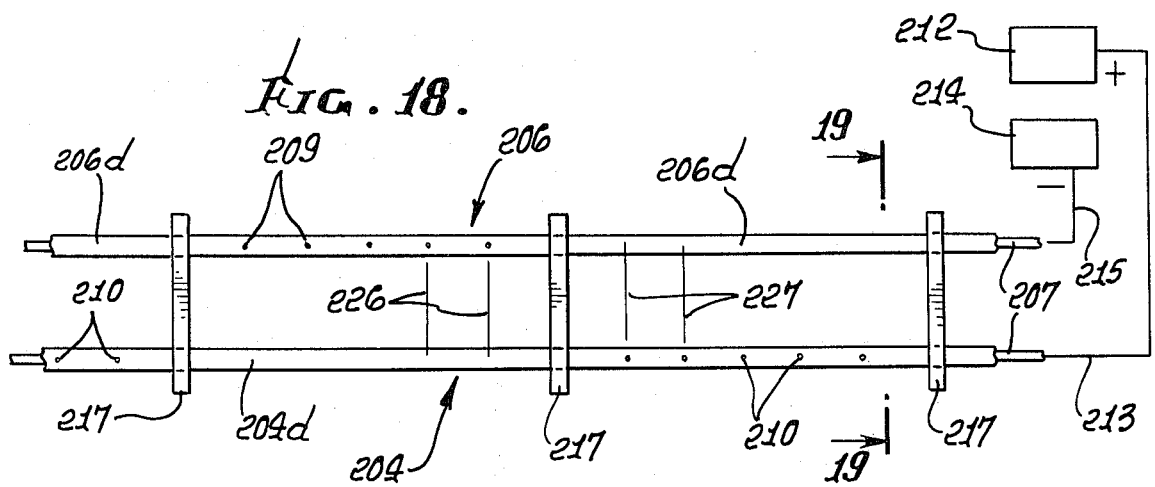
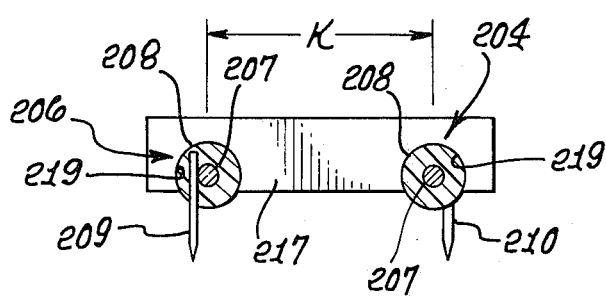
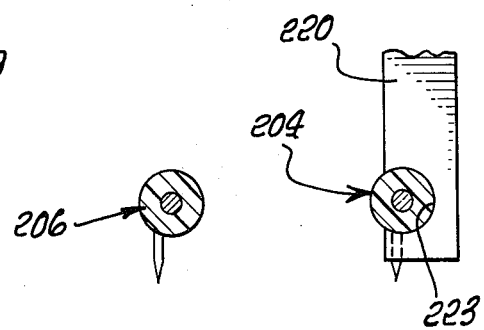
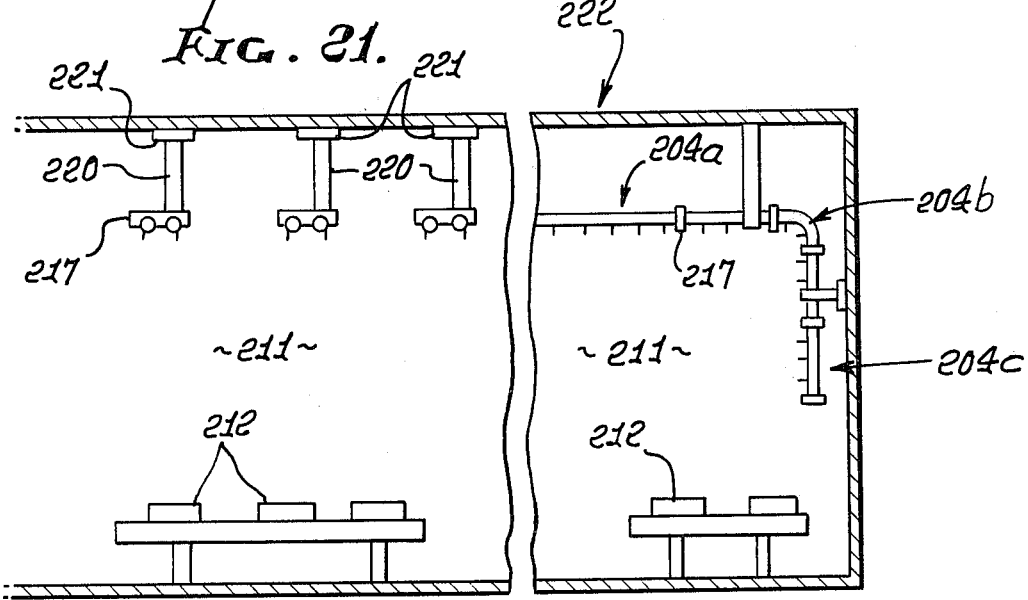

CONTROL OF STATIC NEUTRALIZATION

BACKGROUND OF THE INVENTION

This application is a continuation-in-part of Ser. No. 259,503, filed May 1, 1981, which is a continuation-in-part of Ser. No. 241,684, filed Mar. 9, 1981, which is a continuation-in-part of Ser. No. 124,242, filed Feb. 25, 1980.

This invention relates generally to the provision of cable means with ion dispensing needles, located in zones for treatment of work such as plastic articles, animals and edibles.

There is need for low cost, efficient means to induce collection of air-borne particles, and to suppress static build-up in certain article treating zones (electric parts production, plastic parts or material production, paper rolling apparatus, surgical operating rooms, clean room assemblies, and circuit board fabrication, etc.). Prior ion dispensing devices were not easily installable to conform the special requirements as to product shape, zone size, etc., and often did not achieve desired static neutralization contrary to expectations.

In addition the smoke treatment of meat, enhanced through ion dispensing, was not sufficiently controllable; and the use of ions to reduce air-borne particles and ammonia gas is poultry and animal zones was not sufficiently controllable.

SUMMARY OF THE INVENTION

It is a major object of the invention to provide method and apparatus to achieve controlled neutralization or reduction of static charge on or associated with work, or to achieve controlled net positive or negative ion flux in areas at or adjacent to work.

The apparatus for reducing static electricity in a work zone basically comprises:

(a) first electrically conductive cable means having tips spaced therealong to dispense positive ions in response to positive voltage application to the first cable means, (b) second electrically conductive cable means having tips spaced therealong to dispense negative ions in response to negative voltage application to the second cable means, and (c) said cable means located at adjusted separations from one another characterized in that static electricity at or proximate the work is effectively reduced to non-objectionable levels when said positive and negative voltages are applied to the cable means, (d) there being spacers located along the lengths of the cable means and holding the cable means at said adjusted separations.

As will appear, the cables are typically flexible so as to bend and fit in different work areas, and the spacers hold the cables in such alignment that tips on the two flexible cables project in generally the same direction, i.e. toward the work area. The spacers may comprise bars having notches to removably receive the cables, and holders are provided to support the cables at selected spacing from enclosure structure.

As will also appear, pairs of cables, each with ion dispensing tips, are located at adjusted distances from the work, the cables of each pair having adjusted separation and being respectively adapted to receive positive and negative voltage application, all for the purpose of achieving static charge neutralization or reduction at or adjacent the work. In addition, the spacing of the tips or needles on the cables is adjusted to achieve that objective.

Typically, groups of tips on the first cable of a pair are staggered relative to groups of needles on the second cable of that pair; and the number of tips in such groups may be adjusted (as by removal of selected tips, for example) to achieve desired balance of positive and negative ions in the work zone toward which the tips project.

The invention enables static charge control in work zones, elimination of dangerous arcing in such zones, and control of net ion flux in animal or poultry zones and in edibles smoke houses, to provide unusual advantages, as will appear.

These and other objects and advantages of the invention as well as the details of an illustrative embodiment, will be more fully understood from the following description and drawings, in which:

DRAWING DESCRIPTION

FIG. 5 is an upward looking plan view on lines 5—5 of FIG. 1.

FIG. 6 is a side elevation of a smoke house interior;

FIG. 7 is a side elevation of a modified lower portion of the FIG. 1 smoke house interior;

FIG. 18 is a plan view of modified apparatus;

FIG. 19 is a section on lines 19—19 of FIG. 18; and

FIG. 20 shows cable support; and

FIG. 21 shows cables in an article treatment zone.

DETAILED DESCRIPTION

Figure 10:
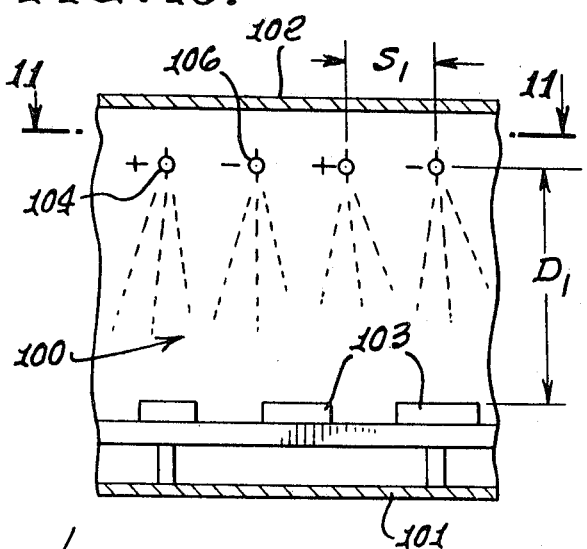
FIG. 10 is a side elevation showing an article treatment zone, with ion dispersing, static treatment cable means therein.

In FIG. 10, apparatus is shown for reducing or controlling static electricity in a work zone 100. The latter may be defined between a floor 101 and a ceiling 102. Located within that zone is work in the form of articles 103, which for example have static electricity associated with handling or other processing. Danger of fire may arise due to such charge build-up. Typical of such articles are foam plastic materials such as sheets, slabs, or pieces.

In accordance with the invention, first electrically conductive cable means is provided to have tips spaced therealong to dispense ions into the work zone in response to positive voltage application to the first cable means. See for example the first cables or cable lengths 104 having needle tips 105 spaced along the cables; the cables may be located generally above the work so that positive ions are dispensed from the needles to travel generally downwardly toward the work, but may move in various directions.

Second electrically conductive cable means is also provided to have tips spaced therealong for dispensing ions into the work zone in response to negative voltage application to the second cable means. See for example the second cables or cable lengths 106 having needle tips 107 spaced therealong. Such second cables may also be located generally above the work, so that negative ions are dispensed from the needles 107 to travel generally downwardly or otherwise in the zone and toward the work.

Figure 11:
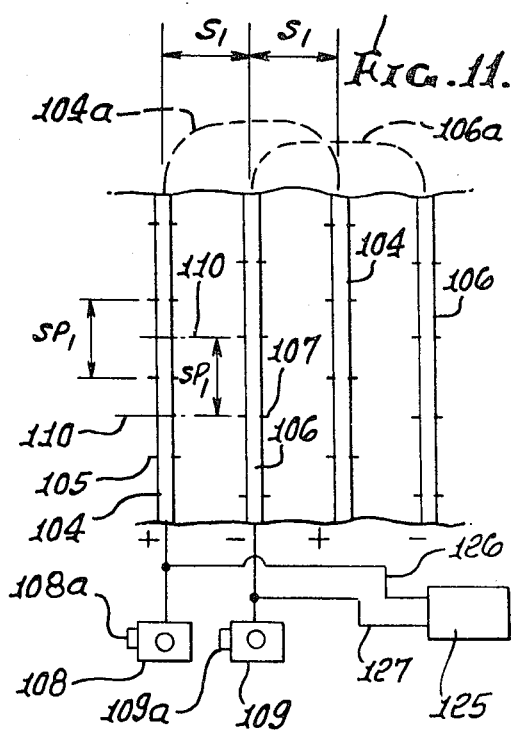
FIG. 11 is a plan view on lines 11—11 of FIG. 10.

FIG. 11 shows a typical arrangement, with the first and second cables located in sidewardly separated, alternating relation, the cable lengths extending in generally parallel relation, with separation $S_1$. Cable bends 104a interconnect the parallel lengths 104, and cable bends 106a interconnect the lengths 106. DC voltage sources are shown at 108 and 109 respectively electrically connected with the cables 104 and 106. The cables may be formed as in FIGS. 2-4.

In accordance with an important aspect of the invention, the cable means are located at adjusted distances from the work (see distances $D_1$ for example) and at adjusted separations from one another (see separations $S_1$ for example), and characterized in that static electricity at or proximate the work is effectively reduced to non-objectionable levels when the described positive and negative voltages are applied to the cables. For example, the distances $D_1$ and the separations $S_1$ may be varied until static levels at the work are effectively eliminated. Note in this regard the spacings $SP_1$ between the needles on each of the cables 104 and 106, such spacings being approximately equal. Further, for best results, the cable 106 tips 107 are in positions to be intersected by perpendiculars 110 from the first cables 104 on either side of cable 106, such perpendiculars intersecting the first cables approximately mid-way between the tips 105.

Figure 12:
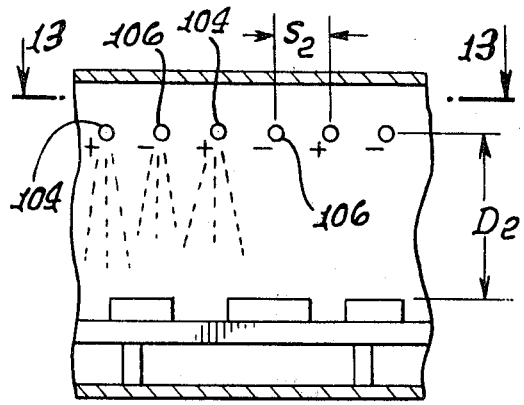
FIG. 12 is another view like FIG. 10.
Figure 13:
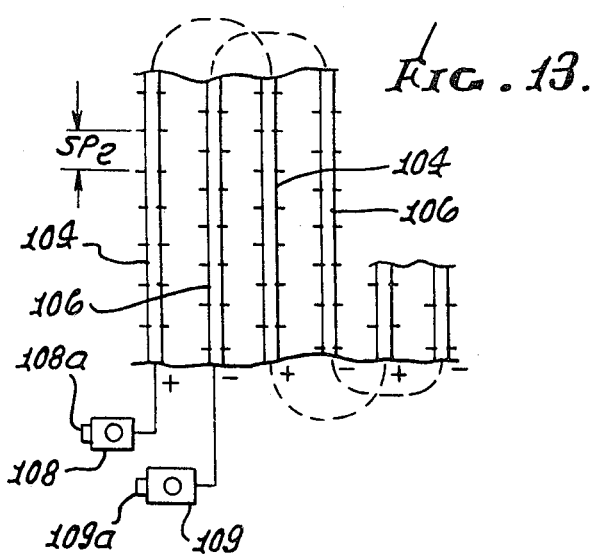
FIG. 13 is a plan view taken on lines 13—13 of FIG. 12.
Figure 14:
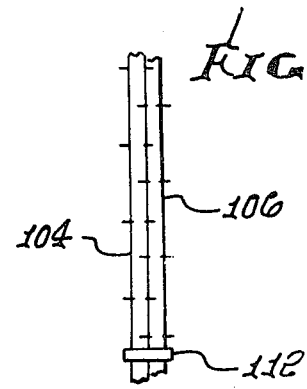
FIG. 14 is a plan view of two cables connected together.

In FIG. 12, the cables 104 and 106 are closer to the work, i.e. their distances $D_2$ from the work are less than cable distances $D_1$ from the work in FIG. 10. Further, to achieve static neutralization, the lateral separations $S_2$ of the cables are less than the lateral separations $S_1$ in FIG. 1; and FIG. 13 shows that the needle spacings $SP_2$ are less than the needle spacings $SP_1$ in FIG. 11. These relationships are further exemplified in FIG. 15 (showing that as D decreases, S is decreased for static neutralization) and in FIG. 16 (showing that as D decreases, SP is also decreased for static neutralization). In FIG. 14 the separation between cable lengths 104 and 106 has been decreased to the point where the cables are connected together, as by clip or tie 112.

EXAMPLE 1

Cables 104 and 106 were located at a distance $D_1$ (see FIG. 10) about 12 feet above floor level, i.e. 6 to 8 feet above the work. Static was neutralized when the positive and negative cables separation $S_1$ was 4 feet, and the needle spacing $SP_1$ was about 2 feet along each cable. The applied voltages were 18K–35K DC volts positive and 18K–35K DC volts negative.

EXAMPLE 2

Cables 104 and 106 were located at a distance $D_2$ (see FIG. 12) about 1–3 feet above the work. Static was neutralized when the positive and negative cables separation $S_2$ was 4 to 12 inches, and the needle spacing was about 3–6 inches along each cable. The applied voltages were 3K–18K DC volts positive to cables 104, and 3K–18K DC volts negative to cables 106.

Figure 17:
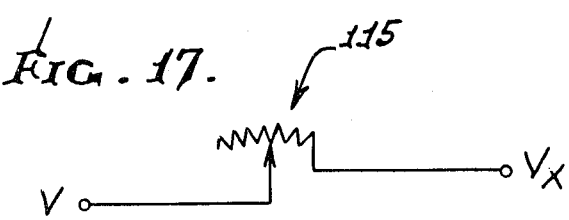
FIG. 17 is a circuit diagram.

In general the voltages applied to cables 104 and 106 should be about the same, but of opposite polarity; however the voltages may be adjusted relative to one another, to achieve zero static voltage (as might be necessary where the work voltage continues to be biased positive or negative). Note the voltage adjustment controls 108a and 109a in the power supplies. As an example, FIG. 17 shows voltage V controlled to voltage $V_x$ by variable resistance 115. FIG. 11 shows circuitry such as a comparator 125 connected at 126 and 127 with outputs of 108 and 109 to provide a warning (light, sound, etc.) if the system voltage fails or goes out of balance.

Figures 15, 16:
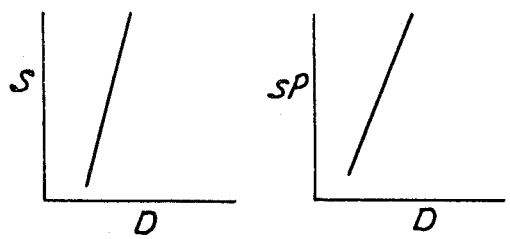
FIGS. 15 and 16 are graphs.

FIGS. 15 and 16 show the manner in which each of S and SP varies with D, to achieve static neutralization.

In the above relatively inflexible cables such as bars may be utilized, the bars also having busses and needles or tips, as described.

It is found that the combined effect of the positive and negative ions efficiently suppresses arcing (which can produce fire) otherwise due to positive or negative charge or static build-up on the articles or work. Also, air-borne particles are caused to collect on enclosure surfaces, to maintain the atmosphere in the work zone in clean condition.

Figure 1:
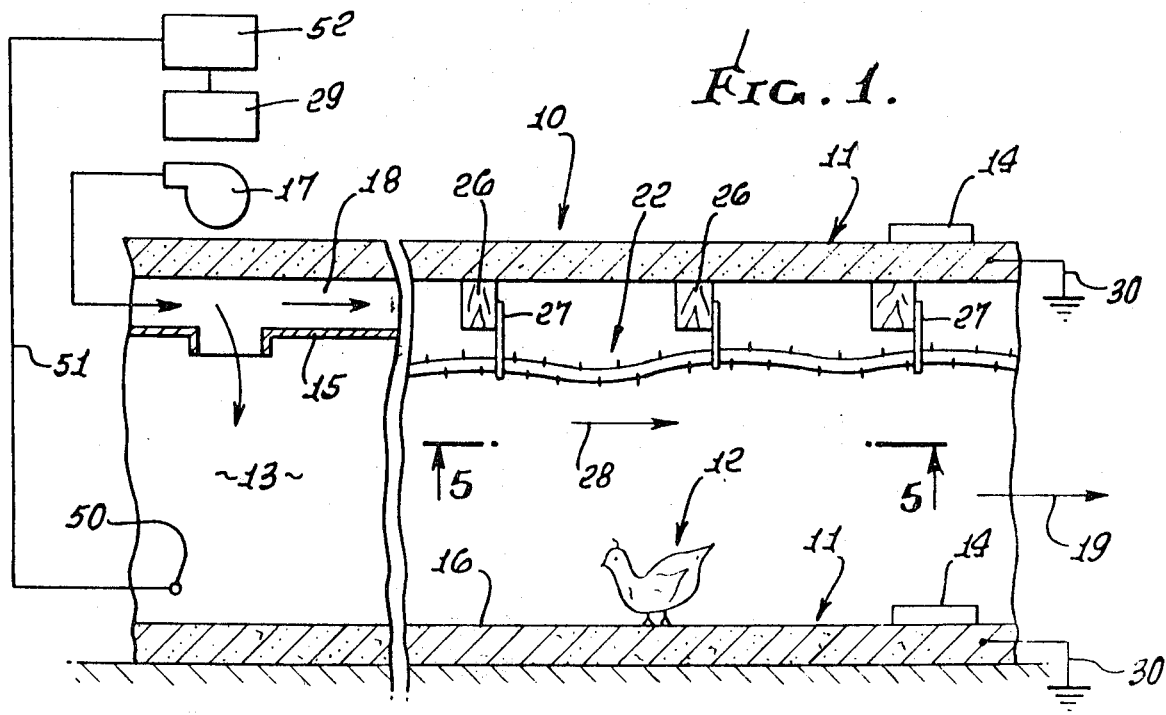
FIG. 1 is a side elevation of a poultry (or other animal) enclosure.

In FIG. 1, a poultry enclosure 10 contains decks 11 between which growing poultry 12 are kept in feeding zones 13, with access to feed in containers 14. This particular arrangement is illustrative only, and many different enclosure and feeding systems may be used, and for animals other than poultry.

The feeding zones characteristically contain airborne particulate matter, and there are particle collecting surfaces as at 15 and 16 exposed to the zone interiors. As stated, the presence of such air-borne particulate matter, stirred by movement of the poultry (or other animals) and by moving air, is hazardous and inhibits poultry growth and production. In this regard, ammonia gas and odor generated by droppings and urine is a further health hazard, and air blower 17 is operative to displace air currents via overhead ducting 18 into the zones 13 in an effort to remove such gas from zones 13; however, such flowing air stirs up dust particles as may originate from the environment and in the feed, further aggravating that source of irritation. Air streams leaving the enclosure via suitable outlets are indicated at 19.

Figure 2:
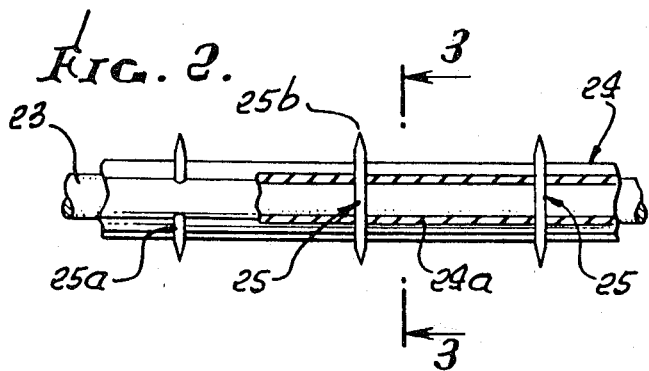
FIG. 2 is a section, in side elevation, showing an ion dispensing cable incorporating the invention.
Figure 3:
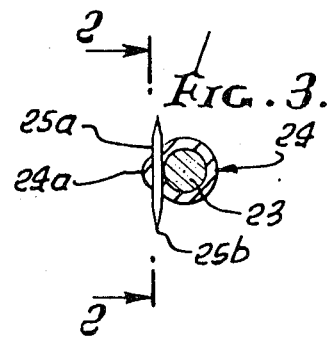
FIG. 3 is a section on lines 3—3 of FIG. 2.

In accordance with a further aspect of the invention, Ions are dispensed into the zones 13 and with density and polarity to induce collection of the air-borne particles on the collecting surfaces. In addition, the dispensing step may be carried out to travel the ions into contact with air-borne micro-organisms and droppings or contaminants in the zone, thereby to inhibit ammonia generation and diffusion. Means to dispense ions may advantageously comprise positive and negative cables, indicated generally at 22, and which are typically flexible, and each including an elongated and sidewardly penetratable metallic core 23 to which voltage is applicable. As seen in FIGS. 2 and 3, the core may consist of 18–22 gage strands of copper or aluminum, or other electrically conductive material. The cable also includes a protective sleeve 24 of insulative material on and extending about and along the core. The insulative sleeve may for example consist of polypropylene or polyethylene.

The ion dispensing apparatus also includes needles 25 having shanks 25a penetrating through the sleeve wall 24a and sidewardly adjacent the core to make electrical contact therewith, the needles typically consisting of electrically conductive material such as stainless steel, possibly plated with copper or gold alloy. The needles, to which voltage is transmitted via the cable core have sharp tips 25b openly exposed outwardly of the cable to dispense ions into the atmosphere near the cable. As shown, the needles are compressively retained by the stretched sleeve in sideward contact with the core. This construction avoids need for needle penetration into the core.

In FIGS. 1 and 5, multiple cables 22 are suspended from beams 26 associated with enclosure 10, the cables typically extending in parallel relation. Ties 27 suspend the cables from the beams, and may consist of NYLON, for example, whereby the cables may readily be located to most effective use, in the upper interior of zone 13, in the path of air streams 28 so that ions produced at the needle tips by corona effect are electrically repulsed and travel divergently outwardly into the air. One useful circuit to provide the negative voltage source 29 (connected to cable 22a) is described in U.S. Pat. No. 3,308,344. The decks 11 are typically grounded (i.e. made electrically positive) at 30, whereby negatively charged dust particles and micro-organisms are electrostatically attracted to deck surfaces. A positive voltage source 129 is connected to cables 22b, and these sources may be controlled to produce a required net negative ion flux, for optimum treatment of poultry or animal zones.

Negative ions not only act to substantially reduce (by settling) the air-borne particulate matter including micro-organisms, but they also are believed to cause celia in the poultry breathing organs to operate efficiently thus causing the respiratory system to better filter out any particulate matter and micro-organisms remaining in the air. This also improves poultry (or animal) health.

As described in U.S. Pat. No. 3,696,791, an increase in poultry feeding to gain full size within six weeks rather than the normal eight weeks was achieved after use of the ion dispensing means and method described, with about 2,000 static volts maintained in the air at 13, all other conditions remaining the same before and after inclusion of the ion dispensers. Higher static volt levels, say up to 4,000 or 5,000 produce even better results in terms of rate of weight gain. Good results are obtainable with negative supply voltage between 500 and 18,000 or above. Another beneficial result is reduction in the amount of the blown air needed to remove ammonia gas. It was also found that good results were obtained when voltage delivery to the needles, i.e., ion production, was intermittent, i.e., several time periods "on", several periods etc. "off", etc. It has been found that negative ions produce the best results but both negative and positive ions may be dispensed, with negative ions predominating, as described.

It is clear from FIG. 3 that the needles may be out of alignment lengthwise of the cable, although some may be in alignment. Typically, the needles 25 are located at intervals as described above, and the cables separated from one another, and located at distances from the animal areas, as described above. The core is between about 3/16–½ inch in diameter. Thus, the flexible cable is adapted to be sent or curved (as at 40 in FIG. 5) lengthwise to be strung about the zone 13 as desired. Accordingly, the cables are located and also bent or curved as at 40 and 40a to conform with a desired relation within the zone forming means (such as a housing) to produce sufficient ions to suppress dust particles and ammonia.

FIG. 1 also shows a static voltage sensor 50 in zone 13, and connected in feed-back relation at 51 to a control device 52 for the voltage generator 29, and/or 129, and operating to control the voltage level or "on-off" or other output parameter of 29 and/or 129, so as to maintain desired static voltage level at 13.

Additional advantages of the invention include:
(1) reduced cost of materials;
(2) increased ion output due to needles not being enclosed;
(3) reduced cost of installation and maintenance, due to ease of cleaning of needles, as by a brush;
(4) random location of needles along and about a cable axis;
(5) ease of installation of the needles on the cable as by pushing them through the sleeve so as to be held adjacent the core of the sleeve.

Figure 4A:
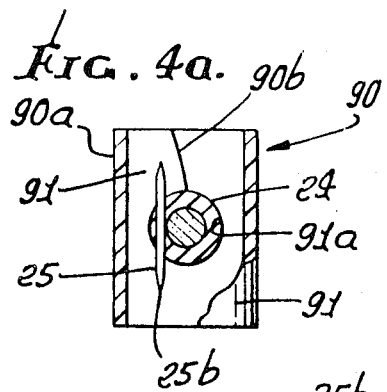
FIG. 4 is a view like FIG. 3 showing a cable with a needle protector device on the cable.
FIG. 4b is a side elevation of the FIG. 4 protector and cable.
FIG. 4c is a view like FIG. 4a showing a modified needle protector on a cable.
FIG. 4d is a side elevation of the FIG. 4c protector and cable.
Figure 4B:
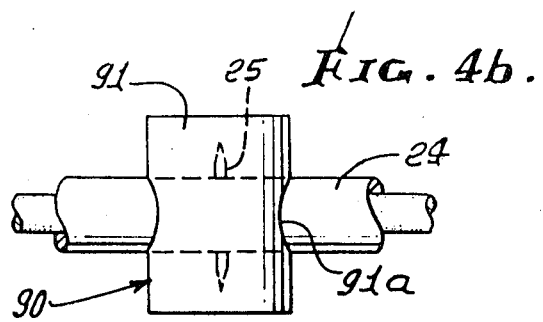
Figure 4C:
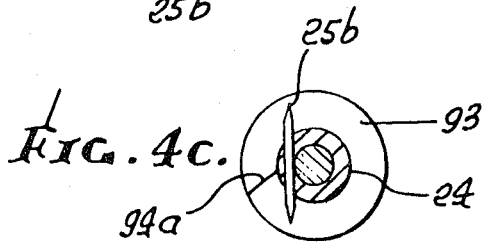
Figure 4D:
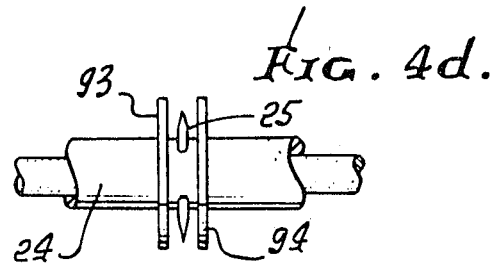

FIGS. 4a and 4b illustrate one form of protective means on the cable and projecting outwardly thereof proximate the needles in protective relation with the tips. As shown, the protective means comprises tubular elements 90 extending about the needles and having resiliently spreadable slits accommodating their application to the cable. See for example the plastic tubular bodies 90a sized to fit about the cable when slits or slits 90b are spread apart, the slits located in opposite walls 91. The latter define openings 91a to pass the cable. Accordingly, the user is protected against shocks from touching the needle tips, and the needle tips are protected against blunting by contact against solid objects. FIGS. 4c and 4d shows modified protective means in the form of plastic flanges 93 and 94 on the cable at axially opposite sides of each needle, and extending in plane generally normal to the cable length or axis. The flanges project radially outwardly beyond the needle tips as to the protectors 91. Each flexible annular flange may be slit as at 94a to accommodate its application to the cable. The flange inner diameter is approximately the same as the cable outer diameter.

In FIG. 6, a smoke house or enclosure 140 contains a support such as a metallic rack or grate 41 on which bodies of meat (or other consumables) 42 are supported. The rack may be suitably electrically grounded, as indicated at 43; alternatively, the smoke house walls 44 may be grounded, and the metallic rack or grate connected to such walls. The house also typically includes a roof 45 and a floor 46, and means such as fans or other apparatus may be located in the interior zone 48 to cause smoke to thoroughly circulate about the meat bodies for intimate contact therewith.

Smoke may be delivered to the interior 48 as via a duct 49 with outlets 150 spaced along the floor, i.e. beneath the rack 41, so that smoke rises under and toward the meat. A suitable smoke source is indicated at 151, connected with duct 49. Outlet 53 from zone 48 serves to deliver excess smoke to the exterior via damper valve 152. In the past, such excess smoke escape was considered objectionable, as constituting a source of pollution, as well as a cost item.

Electrically charged ions are dispersed or dispensed into the smoke particles, with the ion charge causing the smoke particles to be attracted onto the consumables or edibles, such as the meat. In this regard, the ions typically carry negative charge, which is imparted to the smoke particles causing them to be attracted to the meat, the latter initially having an electrical charge or charges which is or are more positive than that of the dispersed ions. Thus, for example, the meat may be effectively grounded because of its contact with grounded grate or rack 41.

In FIG. 6 the smoke is dispersed into a lower region 48a of zone 48 below the edibles, to rise in currents 58 against the undersides of the meat bodies, and between the meat bodies, into the upper region 58b of zone 18 wherein the ions are dispersed. As a result, the smoke particles in zone 58b then are attracted back downwardly toward and onto the meat, whereby the meat becomes effectively smoke treated much more rapidly than in the past where ion treatment was not employed.

The means to disperse charged ions (see broken lines 59) into the smoke is shown to include cables 22 as previously described, in FIGS. 1-5, and which are strung or hung to extend generally horizontally and in upper zone 18b above the meat or edibles. Such cables include ion dispensing needle tips 25b as described. The cables are separated from one another and located at distances from the work, as described above. A power source at 61 for delivering high voltage to the cable core and the needles and tips may be as disclosed in U.S. Pat. No. 3,308,344. Positive and negative voltages are supplied to alternate cables, as described, and they may be controlled to achieve a desired net negative ion flux. Between 2,000 and 50,000 volts DC are typically applied to the tips. Cable supports appear at 26 and 27.

Inasmuch as the smoke particles are attracted to the meat or edibles, very little if any excess smoke requires venting at outlet 53, smoke pollution is effectively eliminated, and minimum smoke is required, saving expense. Also, the smoke treatment time for the edibles is minimized.

In FIG. 7, the smoke source is shown to comprise wood chips above burners, each burner and chip unit being indicated at 64. Rising smoke is indicated at 65.

Figure 8:
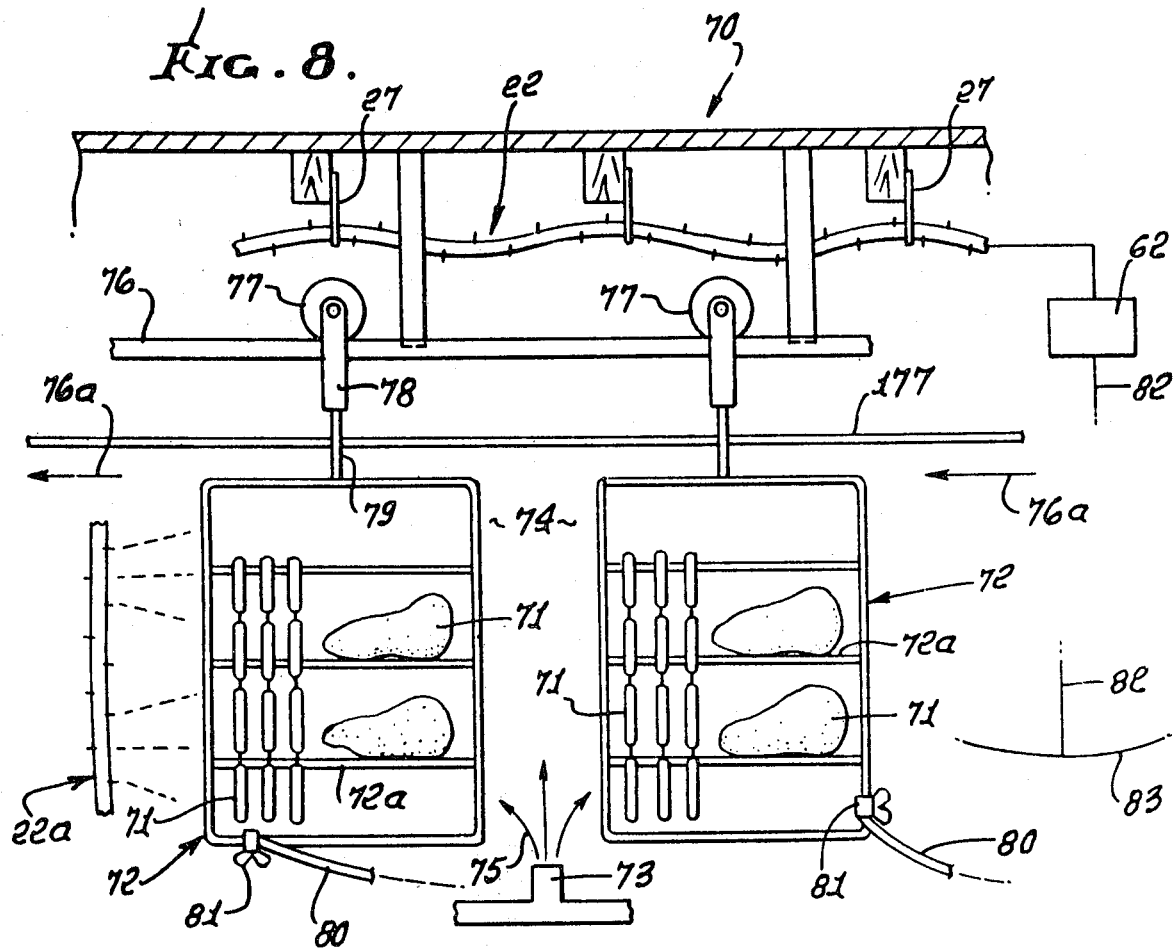
FIG. 8 is a side elevation of a further modification of a smoke house interior.
Figure 9:
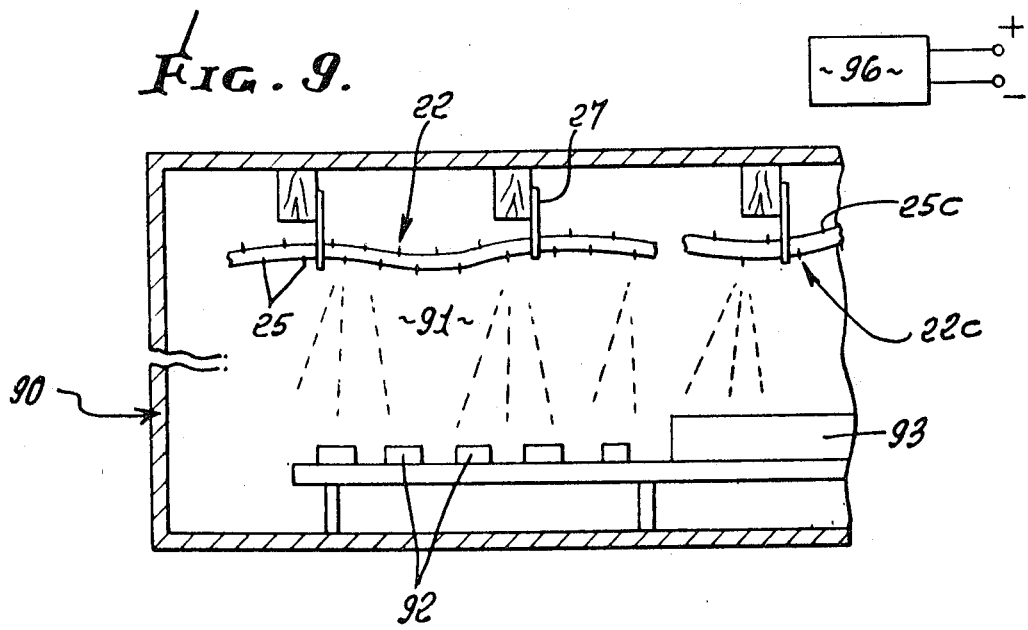
FIG. 9 is a side elevation showing an article treatment enclosure and zone, with ion dispersing flexible cable means therein.

Referring to FIG. 8 smoke house or enclosure 70 contains means supporting multiple edibles 71, such as meat for example. The support means is shown as a metallic carriage 72 with metal supports 72a for the edibles. Smoke source 73 delivers liquid smoke or smoke from a wood chip of sawdust or other fire, to the carriage traverse zone 74, arrows 75 indicating such delivery. Smoke may be produced outside the smoke house and then blown into the smoke house. The support means is shown as movably supported on a rail 76, and for that purpose wheels or rollers 77 move along the rail, wheel support brackets 78 extending under the rail. Upward extensions 79 of the carriages extend through insulative tubular fittings which extend vertically through the bracket extensions 78, and support the carriage extensions, as shown. Therefore, the carriages are electrically insulated from the rail 76. As another alternative, the rail 76 may be electrically insulated from its support structure. These are examples, only.

Means to advance the supports 72 to the left, as indicated by arrows 76a, may include a pull line 177 attached to the supports, or other means.

Means is provided to disperse charged ions into the smoke and into zone 74, with the ions carrying an electrical charge of a polarity causing smoke particles to be attracted to the edibles. Such means is indicated at 22, and take the form of the flexible cables with needle tips previously described. The cables 22 are easily strung to extend back and forth in the enclosure interior, with suitable bends, as previously described, all for the purpose of providing sufficient ions to treat the edibles. Cable supports appear at 27. A cable power source, for positive and negative voltages is seen at 62. Vertical cable appears at 22a.

Means is also provided for maintaining the edibles at an electrical potential or potentials aiding attraction of the smoke particles to the edibles, for enhancing efficiency of smoke deposition, whereby less smoke delivery is needed (less smoke is wasted), the exposure time duration of the edibles to the smoke streams is reduced; and less pollution of air escaping to the interior results. Such means takes the form of structure electrically grounding the edibles, as via the supports 72 for example. Thus, an electrically conductive metallic cable 80 is advantageously employed, and is clipped into firm contact with the metallic supports 72 via alligator clips 81. The cable itself travels along with the supports by virtue of its suspension therefrom, and it may be grounded as by connection to a slack return line 83 connected at 82 to the return or "ground" terminal of the power circuitry 62. The latter terminal is typically positive if the ions dispensed are of negative polarity. Line 83 is slack so as to be free to travel with cable 80 as the latter travels along its looping path. Other type ground connections to cable 80 may be employed.

Examples of meat bodies and other edibles to be smoked are sausage, pork, ham, frankfurters, bacon, beef, chicken, turkey, fish, etc., others also being treatable.

The invention reduces the amount of wood smoke required on the product, and thereby reduces the bitter taste caused by tar and reduces possible cancer forming agents deposited on the product by smoke. Also, smoke pollution near smoke houses is reduced, and the need for pollution control equipment is thereby reduced.

Warning systems, like that at 125 in FIG. 11, may be incorporated in the systems of FIGS. 1 and 6.

In the systems of FIGS. 6 and 8, smoke outlets may be located at various levels on or adjacent the walls, or from locations near the ceilings.

Referring to FIGS. 18 and 19, first and second cable means appear at 204 and 206. Each cable includes an elongated conductive metal core 207, and a protective sleeve 208 of insulative, such as polypopylene or polyethylene, material Ion dispensing tips, as formed for example by needles, are shown at 209 and 210. The tips project generally in the same direction, as toward work areas 211 seen in FIG. 21, there being work elements 212 such areas, to be made static free.

The cables are typically flexible so they can be strung in straight or curved lines or configuration. Note straight cable lengths 204a and 204c, and curved lengths or bends 204b in FIG. 21. Also the cable pair 204 and 206 has adjusted lateral separation characterized in that static electricity at or proximate the work is effectively reduced to non-objectionable level or levels when positive and negative voltages are applied to the respective cables. Note positive voltage source 212 connected at 213 to cable 204, and negative voltage source 214 connected at 215 to cable 206.

Spacers are provided as at 217 and located at selected positions along the cables to hold them at adjusted separation K. The latter is typically between ½ and 1½ inches. Such spacers are shown in the form of insulative plastic bars, having two notches 219 at K separation to removably receive the cables, sidewardly, i.e. with snap-in reception. The notches are sized to receive and firmly retain the cables, as shown in FIG. 19. The cables are frictionally held against rotation, and the needles or tips 209 and 210 are held projecting in the same direction, despite the bending of the parallel cables to conform to room geometry, as at 204b.

Holders are provided to support the cable pairs at selected spacing from enclosure structure. In the example, insulative plastic rods 220 are suitable attached at 221 to the ceiling or wall of enclosure 222, and support the cables. FIG. 20 shows the rod 220 having a side notch at 223, to receive a cable 204 or 206 of a connected pair.

The dual cables 204 and 206 as described, may be employed for purposes as described in FIGS. 1, 6, 8 and 9.

Adjustment of the positive and negative ion dispensation by the tip groups 209 and 210 is also enabled to aid in achievement of substantial neutralization of static in work areas. In this regard, note in FIG. 18 that the tips 209 in cable 206 are sidewardly offset from a portion 204d of the cable 204 which contains no tips; and that tips 210 in cable 204 are sidewardly offset from a portion 206d of the cable 206 which contains no tips. Also, spacers 217 divide such staggered groups 209 and 210, as shown. Further, the tips or needles in each group can be selectively removed to reduce ion dispensation, to aid in achieving static neutralization. Thus, if there is an excess of + charge at a particular location in the work area, one or more needles 210 or tips carrying + charge and located closest to that area may be removed from cable 204, thereby to aid in achievement of charge balance in the work area. Alternatively needles 209 may be added to cable 206. The needles may be pulled from the cable, and re-inserted at will. Note in FIG. 19 that the needles extend adjacent the sides of the cores 207, and held in that position by the plastic sleeve.

An alternate static field balance technique is as shown in FIG. 17. It is found that when the static field in the area of the work is balanced, the static charge on the work itself is rapidly neutralized.

Also in FIG. 18, perpendiculars 226 from cable 204 intersect tips 209, such perpendiculars spaced from tips 210, and perpendiculars 227 from cable 206 intersect tips 210, such perpendiculars spaced from tips 209.

Tip protection means may also be provided (as shown in FIGS. 4a–4d, referred to above) on the cables 204 and 206.

From the above FIGS. 18-21 it will be seen that the method of substantially neutralizing static electricity at work in an extended work zone (the work occupying only a local relatively small portion of that zone) involves the steps:

(a) dispersing into the bulk of the extended work zone including said portion thereof both positive and negative ions, (b) such dispersing carried out to substantially balance the positive and negative ion content in that portion of the zone.

Also, both positive and negative ions are dispersed from a large number of intermixed multiple points spaced about the extended zone.

I claim:

1. The method of reducing static electricity in a work zone, that includes:
    (a) providing first electrically conductive cable means with ion dispensing tips spaced therealong, and to which positive voltage is applicable,
    (b) providing second electrically conductive cable means with ion dispensing tips spaced therealong, and to which negative voltage is applicable,
    (c) said (a) and (b) steps carried out to provide flexible cables having cores to which said voltage is applicable and to have protective sleeves of insulating material on and extending along the cores, the sleeves defining walls, the tips defined by needles having shanks penetrating through the sleeve walls and extending generally sidewardly adjacent core material and make electrical contact therewith so as to receive application of said voltage, the tips openly exposed outwardly of the cables to dispense ions into the atmosphere near the cables,
    (d) locating said first and second cable means, at adjusted separations from one another so that static electricity at or proximate the work is effectively reduced to non-objectionable levels when said positive and negative voltages are applied to the cable means,
    (e) and clamping said cable means at said adjusted separations.

2. The method of claim 1 including the step of adjusting the distance of the cable means from work in said zone to achieve substantial neutralization of the static electricity at or proximate the work.

3. The method of claim 2 including the step of relatively locating the first and second cable means to bring the second cable means tips into positions intersected by perpendiculars from the first cable means, such perpendiculars intersecting the first cable means at loci spaced from the first cable means tips.

4. The method of claim 2 including adjusting the positive or negative ion dispensation by said tips to aid in said achievement of substantial neutralization.

5. The method of claim 4 including the step of applying said positive voltage to said first cable means, and said negative voltage to said second cable means, said ion dispensation adjustment being carried out by selectively removing tips from at least one of the cable means.

6. The method of claim 4 including the step of applying positive voltage to said first cable means, and negative voltage to said second cable means, said ion dispensation adjustment being carried out by varying said voltage application.

7. The method of claim 1 including the step of orienting said cable means to have said tips directed generally in the same direction.

8. The method of claim 1 including the step of relatively locating the first and second cable means to bring the second cable means tips into positions intersected by perpendiculars from the first cable means, such perpendiculars intersecting the first cable means at loci spaced from the first cable means tips.

9. The method of claim 1 including locating groups of said tips on the first cable means in sidewardly offset relation to portions of the second cable means free of said tips, and locating groups of said tips on the second cable means is sidewardly offset relation to portions of the first cable means free of said tips.

10. The method of claim 1 including the step of applying said positive and negative voltages to said respective cable means.

11. The method of claim 1 including locating said work in said zone.

12. The method of claim 11 wherein said work comprises synthetic plastic apparatus.

13. The method of claim 11 wherein said work comprises edibles, and said static electricity reduction is associated with collection of air-borne particles on surfaces in said zone.

14. The method of claim 11 wherein said work comprises animals or poultry, and said static electricity reduction is associated with collection of air-borne particles on surfaces in said zone.

15. In apparatus for reducing static electricity in a work zone, the combination that includes:
(a) first electrically conductive cable means having tips spaced therealong to dispense positive ions in response to positive voltage application to the first cable means,
(b) second electrically conductive cable means having tips spaced therealong to dispense negative ions in response to negative voltage application to the second cable means, and
(c) said cable means located at adjusted separations from one another characterized in that static electricity at or proximate the work is effectively reduced to non-objectionable levels when said positive and negative voltages are carried to the cable means,
(d) there being spacers located along the lengths of the cable means and holding the cable means at said adjusted separations,
(e) said cable means defining cables each of which is flexible and includes an elongated metallic core to which voltage is applicable, the cable including a protective sleeve of insulating material on and extending along and about the core, the sleeve defining a wall,
(f) and needles having shanks penetrating through said sleeve wall and extending sidewardly adjacent the core to make electrical contact therewith so as to receive application of said voltage, the needles defining said tips openly exposed outwardly of the cable to dispense ions into the atmosphere near the cable.

16. The combination of claim 15 including positive and negative voltage source means electrically connected with said respective cable means.

17. The combination of claim 16 including means responsive to unwanted positive and/or negative voltage change to provide a warning indication.

18. The combination of claim 16 wherein said source means includes a positive voltage source connected with the first cable means, and a negative voltage source connected with the second cable means.

19. The combination of claim 18 wherein at least one of said sources includes circuitry which is adjustable to vary the level of voltage applied to one of the first and second cable means.

20. The combination of claim 15 wherein the second cable means tips are intersected by perpendiculars from the first cable means, such perpendiculars intersecting the first cable means at loci spaced from the first cable means tips.

21. The combination of claim 15 wherein groups of said tips on the first cable means are located in sidewardly offset relation to portions of the second cable means free of said tips, and groups of said tips on the second cable means are located in sidewardly offset relation to portions of the first cable means free of said tips.

22. The combination of claim 15 wherein the tips project in generally to same direction, the cable means being flexible.

23. The combination of claim 22 wherein the spacers comprise plastic bars having notches in which the cables are removably received.

24. The combination of claim 22 including holders supporting the cable means at selected spacing from enclosure structure.

25. The combination of claim 15 including said work in said zone.

26. The combination of claim 25 wherein said work comprises synthetic plastic apparatus.

27. The combination of claim 25 wherein said work comprises edibles.

28. The combination of claim 25 wherein said work comprises animals or poultry.

29. The combination of claim 15 wherein said needles are retained by the sleeve in sideward contact with the core.

30. The combination of claim 29 wherein the needles on both cables project in generally the same direction.

31. The combination of claim 15 wherein the needles are aligned, lengthwise of each cable.

32. The combination of claim 15 including protective means on the cable and projecting outwardly thereof proximate the needles in protective relation with said tips.

33. The combination of claim 32 wherein said protective means comprise tubular elements extending about the needles and having spreadable slits accommodating their application to the cable.

34. The combination of claim 33 wherein each of said elements comprises a mounting portion defining a slit and closely surrounding the cable, and a protective tubular portion projecting outwardly and about a needle tip.

35. The combination of claim 32 wherein said protective means comprises flange means spaced apart lengthwise of the cable and extending at opposite sides of the needles.

36. The combination of claim 15 including
(f) means forming said work zone,
(g) and means suspending said cables in said zone.

37. The combination of claim 36 wherein said zone forming means includes supports exposed to the upper interior of said zone, said cables suspended from said supports.

38. The combination of claim 36 including multiple cable pairs suspended in the upper interior of said zone, there being at least one cable bend accommodating the cable to said zone.

39. The combination of claim 36 including edibles in said zone to be treated in response to said ion dispensing.

40. The combination of claim 39 including smoke particles in the atmosphere in said zone to be attracted to the edibles in response to said ion dispensing.

41. The combination of claim 39 including dust particles in the atmosphere in said zone to be suppressed in response to said ion dispensing.

42. The combination of claim 39 including airborne particles and ammonia gas in said zone to be suppressed in response to said ion dispensing.

* * * * *